(12) United States Patent
Castells De Monet et al.

(10) Patent No.: US 11,413,892 B2
(45) Date of Patent: Aug. 16, 2022

(54) OBSTACLE DETECTION

(71) Applicant: HEWLETT-PACKARD DEVELOPMENT COMPANY, L.P., Spring, TX (US)

(72) Inventors: Raimon Castells De Monet, Sant Cugat del Valles (ES); David Munoz Navarro, Sant Cugat del Valles (ES); Josep Tarradas i Juan, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 34 days.

(21) Appl. No.: 17/051,821

(22) PCT Filed: Aug. 28, 2018

(86) PCT No.: PCT/US2018/048304
§ 371 (c)(1),
(2) Date: Oct. 30, 2020

(87) PCT Pub. No.: WO2020/046280
PCT Pub. Date: Mar. 5, 2020

(65) Prior Publication Data
US 2021/0114387 A1    Apr. 22, 2021

(51) Int. Cl.
*B41J 29/393* (2006.01)
*H02P 23/14* (2006.01)

(52) U.S. Cl.
CPC ............ *B41J 29/393* (2013.01); *H02P 23/14* (2013.01)

(58) Field of Classification Search
CPC .......... B41J 29/393; B41J 29/02; B41J 29/38; H02P 23/14

USPC ......................................... 318/563, 560, 565
See application file for complete search history.

(56) References Cited

U.S. PATENT DOCUMENTS

| | | | | |
|---|---|---|---|---|
| 5,920,160 | A * | 7/1999 | Yamada | B60W 10/06 903/906 |
| 5,939,646 | A | 8/1999 | Fowler | |
| 5,977,732 | A * | 11/1999 | Matsumoto | H02H 7/0851 318/434 |
| 6,426,604 | B1 * | 7/2002 | Ito | E05F 15/41 160/293.1 |
| 9,394,739 | B2 * | 7/2016 | Ogawa | E05F 15/695 |

(Continued)

FOREIGN PATENT DOCUMENTS

| CN | 106626826 A | 5/2017 |
|---|---|---|
| DE | 2504199 A1 | 8/1976 |
| EP | 0785070 A2 | 7/1997 |

(Continued)

*Primary Examiner* — David Luo
(74) *Attorney, Agent, or Firm* — HP Inc. Patent Department

(57) ABSTRACT

Obstacle detection for a moving element activated by a motor is disclosed. The obstacle detection may comprise a controller to: move the element at a substantially constant speed; determine an actual torque value to move the element at the constant speed; determine a torque parameter based on the actual torque value; comparing the torque parameter with a threshold value; and determining the presence of an obstacle if the torque parameter is above the torque parameter threshold; wherein the torque parameter is determined based on a set of historical torque values and the actual torque value.

14 Claims, 4 Drawing Sheets

(56) References Cited

U.S. PATENT DOCUMENTS 9,776,438 B2    10/2017   Ruiz Floriach et al.

FOREIGN PATENT DOCUMENTS

| JP | H8318659 A | 12/1996 |
| JP | 2848019 B2 | 1/1999 |
| JP | 2004315216 A | 11/2004 |
| KR | 1020060021922 | 3/2006 |

\* cited by examiner

OBSTACLE DETECTION

BACKGROUND

Printers are, in general terms, devices that modify a substrate as to incorporate an image. Printers normally comprise several moving elements associated to motors for which obstacle detection may be useful. Examples of such moving elements may be elements that move in a direction over the media to be printed either along the media width or the media length, e.g., a printhead carriage, a cutter mechanism, a powder-spreading mechanism or elements that move in a direction normal to the media to be printed, e.g., alignment bars.

Obstacle detection may serve different purposes depending on the moving element on which it is applied. In the example of an alignment bar, obstacle detection may be useful to determine the presence of a media advance mechanism or the media itself.

BRIEF DESCRIPTION OF THE DRAWINGS

Various example features will be apparent from the detailed description which follows, taken in conjunction with the accompanying drawings, wherein.

DETAILED DESCRIPTION

Figure 1:
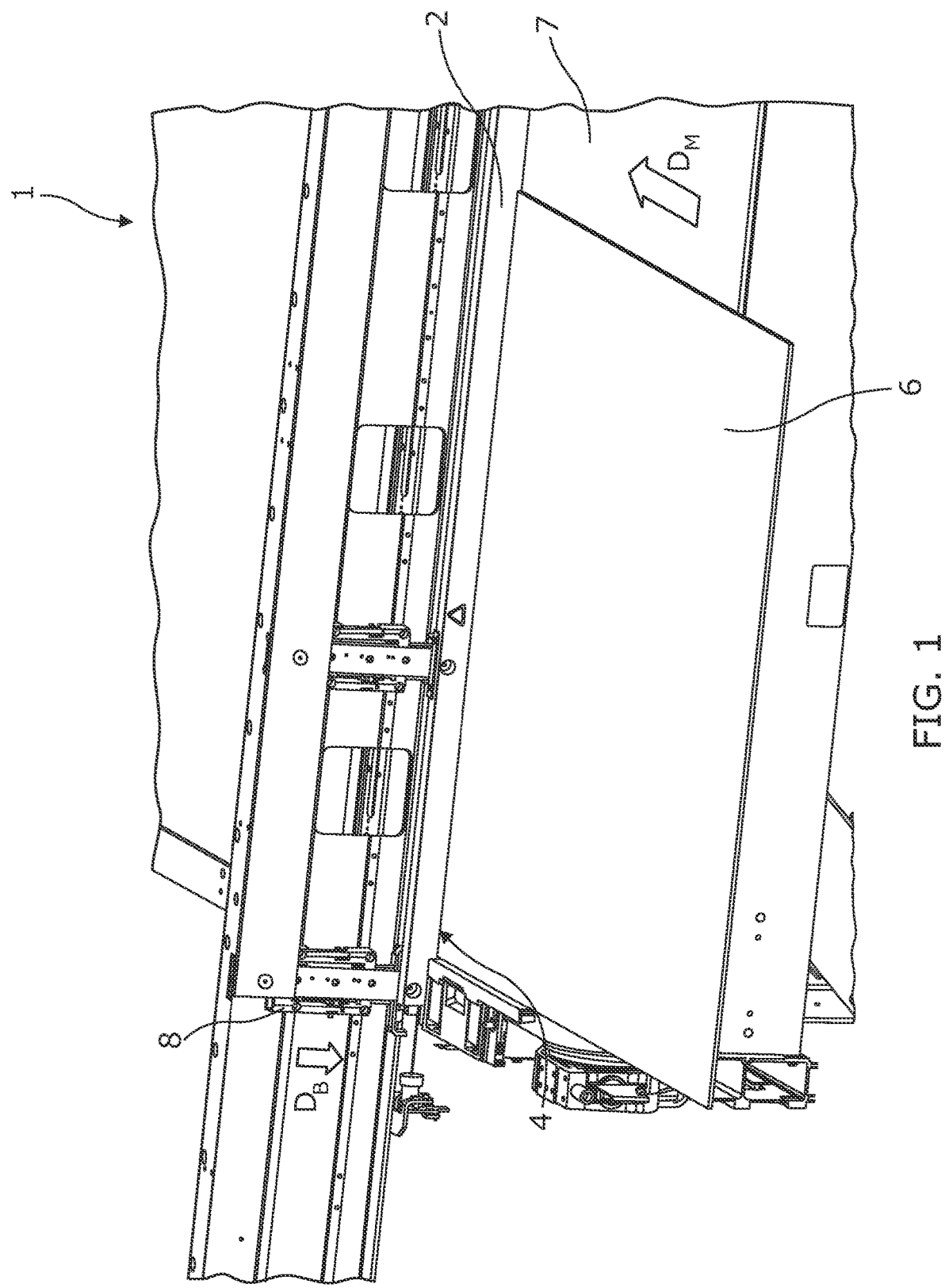
FIG. 1 shows an example of moving element, in particular, an alignment bar of a printing system.

In the following description and figures, some example implementations of print apparatus, print systems, and/or printers are described. In examples described herein, a "printer" or a "printing system" may be a device to print content on a physical medium (e.g., paper, textiles, a layer of powder-based build material, etc.) with a print material (e.g., ink or toner). For example, the printer may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A printer may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

Obstacle detection methods are useful in a printing system. In an example, the printing system comprises an alignment bar wherein the alignment bar is an element that is configured to move downwards (in a direction normal to the substrate) until it reaches an obstacle, in an example, the obstacle may be a conveyor belt and, therefore, the alignment bar may help determine the position of the belt for calibration purposes.

In a further example, the obstacle may be a substrate that moves with the belt along a media path direction. In such an example, the alignment bar may be used to determine the position on which the substrate was detected and, together with the position information of the belt, a controller may calculate the substrate thickness.

In some cases, the substrates may be compressible or easily deformable substrates and, therefore, a sensitive object detection may be particularly useful. Therefore, it is hereby disclosed an easy-to-implement and substantially inexpensive solution for an obstacle detection method for a moving element activated by a motor wherein the obstacle detection method is to:

move the element at a substantially constant speed;
determine an actual torque value to move the element at the constant speed;
determine a torque parameter based on the actual torque value;
comparing the torque parameter with a threshold value; and
determining the presence of an obstacle if the torque parameter is above the torque parameter threshold;
wherein the torque parameter is determined based on a set of historical torque values and the actual torque value.

In an example, the determination of the actual torque value comprises a calculation based on an energy applied to the motor to maintain the constant speed.

In a further example, the motor is energized using a pulse-width modulation (PWM) signal and the energy applied to the motor is an effective energy in the PWM signal. The effective energy may be, e.g., an average current applied to the motor during a specified sampling period.

Also, the torque parameter may be, for example, a differential torque calculation between the actual torque value and a reference value that may be a previous torque value, i.e., a previous torque value that is stored in a memory. The controller may access the memory to acquire the previous torque value and the torque parameter may be the difference between the actual torque value and the previous torque value stored in the memory. The reference value may also be, e.g., an average of a set of historical torque values. Moreover, the set of historical torque values may comprise torque values determined by the controller on previous movements of the element.

As for the threshold value, it may be a function of the set of historical torque values being the set of historical values selected for a threshold period, e.g., it may be an increase over 70% on the average of previous torque values, i.e., over 1.7 times the average of the set of historical values or a similar type of function, in another embodiment the threshold value may be an increase of over 100% on the average of previous torque values. In an example the set of historical torque values may be the values of at least the last 30 torque values determined or the torque values corresponding to, at least, the last 100 ms. In an example, the sampling frequency of torque values may be at least 20 kHZ with storage period of over 100 ms.

In an example, the method further comprises updating the set of historical torque values with the actual torque value.

Moreover, the position of the moving element may be monitored and wherein, upon the determination of the presence of an obstacle, the position of the moving element corresponding to the obstacle is stored. Such position may be later used as a calibration signal or, e.g., as a substrate detection signal.

Also, it is disclosed a printing system comprising a moving element, a motor to move the element and a controller associated to the motor and comprising a memory, the controller being to:
feed energy to the motor as to move the element at a constant speed;
determining an actual torque value based on the fed energy;
determine a torque parameter based on the actual torque value;
compare the torque parameter with a threshold value stored in the memory; and
determine the presence of an obstacle based on the comparison between the torque parameter and the threshold value;
wherein the torque parameter is determined by operating the actual torque value with a reference torque value stored in the memory, being the reference torque value a dynamic value. A dynamic value should be understood as a value that may change in time, e.g., that may be modified based on a determination of an actual torque value.

In an example, the energy is fed to the motor as a PWM signal and the determination of the actual torque value includes calculating the effective energy of the PWM signal.

Further, the torque parameter may be a gradient torque parameter, e.g., defined by the difference between the actual torque value and the reference torque value.

In a further example, the reference torque value is an average of a plurality of previous determinations of the actual torque value. The previous determinations of the actual torque value may also be considered as historical torque values according to the present disclosure.

Further, the controller may be to update the reference torque value based on the actual torque value, e.g., adding the actual to torque value to the historical torque values stored in the memory.

Also, it is disclosed a non-transitory machine-readable medium storing instructions executable by a controller, the non-transitory machine-readable medium comprising instructions to.
move an element at a substantially constant speed;
determine an actual torque value to move the element;
determine a torque parameter to move the element at the constant speed;
compare the torque parameter with a threshold value; and
determine the presence of an obstacle if the torque parameter is above the torque parameter threshold;
wherein the torque parameter is determined by averaging a set of torque values, the set of torque values including the actual torque value.

FIG. 1 is an example of a printing system 1 that comprises moving elements 2 such as, for example, an alignment bar.

In the example of FIG. 1, the alignment bar 2 is a moving element configured to move along a bar direction ($D_B$) that may be a direction normal to a substrate 6 and/or a conveyor 7. The conveyor 7 has the function of a media advance mechanism and is to transport the substrate 6 through the different parts of the printer along a media path direction ($D_M$) that may be, e.g., perpendicular to the bar direction ($D_B$).

The alignment bar 2 may be associated to a motor for moving the bar along a guide 8 in the bar direction ($D_B$). In an example, the motor may be to move the alignment bar 2 at a constant speed until it reaches an obstacle and may record the position of such an obstacle. In an example, the obstacle may be the conveyor 7 or the substrate 6.

In an example, during a calibration process, the alignment bar may be operated to detect the position of the conveyor 7, such position may be stored in a memory and calibrated as a reference position. Subsequently, upon the loading of a substrate the alignment bar may be operated to detect the position of the substrate 6 and a controller may be to determine in view of the position of the substrate and the position of the conveyor belt, the thickness of the loaded substrate 6. The controller may be a combination of circuitry and executable instructions representing a control program to perform the functions described.

Furthermore, the motor may be associated to an encoder as to determine the position of the alignment bar along the bar direction ($D_B$).

The alignment bar 2 may be moved by the motor as to achieve a substantially constant speed, once such a speed is achieved, the energy consumed by the motor to maintain the constant speed is monitored. Such energy is considered to be proportional to the torque required to move the alignment bar. The controller may, therefore, be able to determine an actual torque value in view of the energy consumed by the motor in a determined instant.

Different types of motors, different mechanic configurations, or even physical changes in the mechanics may have different torque profiles, so the actual torque value may not be reliable enough in some applications to monitor different types of systems or may involve several calibration and re-calibration proceedings. Therefore, it is provided to monitor a torque parameter that, additionally to the torque value considers other values, e.g., a reference torque value that, in an example, may be based on historical torque data.

In an example, the reference value may be a dynamic value, i.e., a value that changes over time and may be based on historical torque data that could be, for example, torque data acquired by the controller in a previous movement of the alignment bar, e.g., in a calibration or in a previous obstacle detection. In a further example, the reference torque value may be a fixed value such as a reference value associated to the motor or the element and may be pre-configured and stored in a memory accessible by the controller.

Furthermore, the historical data may be, e.g., an average of previous torque values obtained by the controller. In such an example, the controller may store in a memory a set of previous torque values associated to the movement of the element 2 at constant speed, in an example, the torque values of the last 30 measurements are stored. In a further example, the torque values of the last 144 ms seconds are stored. Such set of values may be averaged, and such average may be stored as a reference torque value.

In the example of FIG. 1, upon reaching an obstacle, the torque that the motor 3 applies to move the alignment bar 2 increases. The controller may be to identify a change in the torque, e.g., by calculating a torque parameter in view of the actual torque value and a reference torque value that may, in turn, be based on historical torque data and, subsequently, determining if this change of torque is sufficient to establish the presence of an obstacle, e.g., by comparing the change of torque with a pre-defined threshold value.

Figure 2:
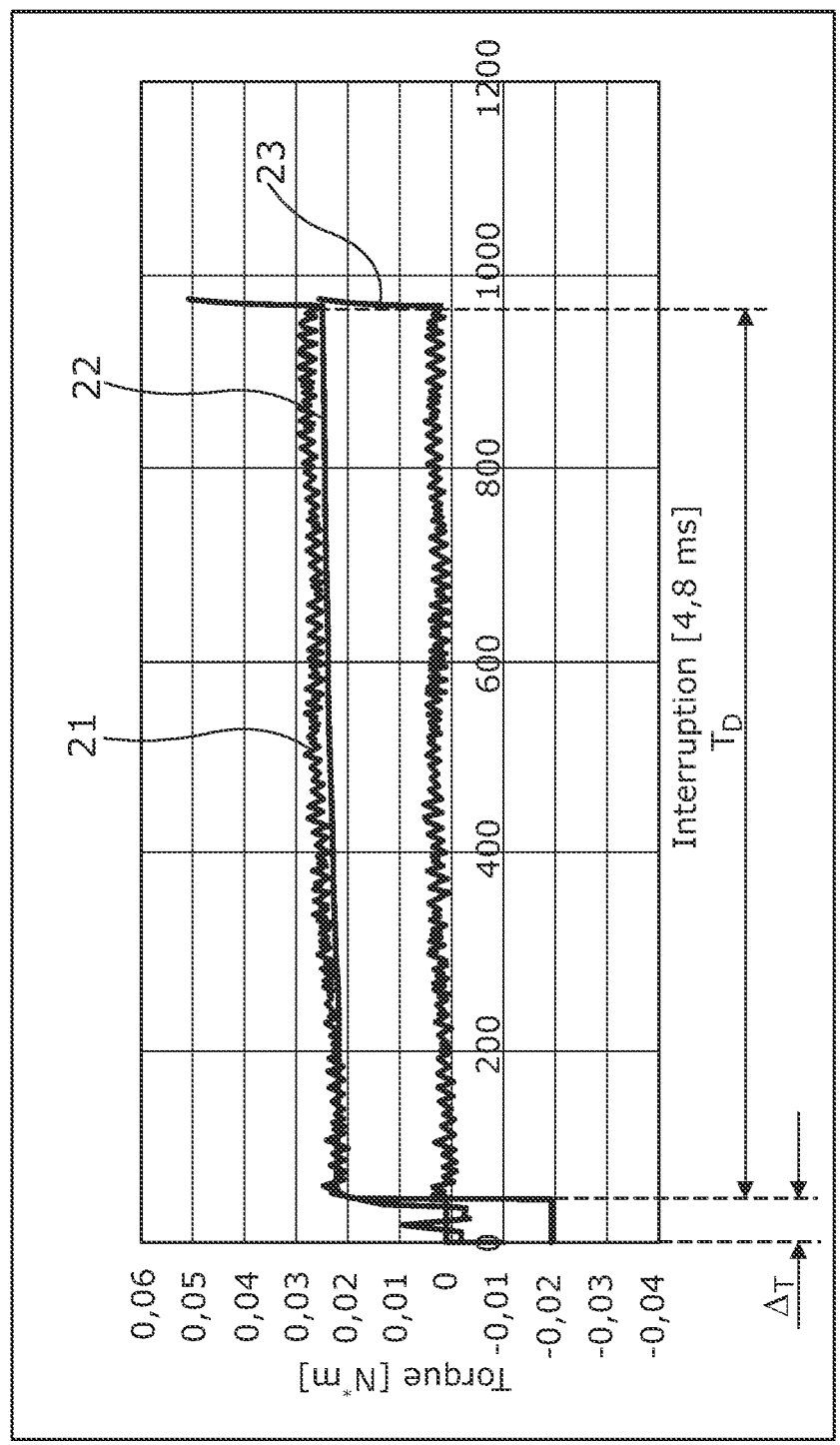
FIG. 2 shows a graph illustrating an example of torque signals that may be used during an object detection.

FIG. 2 shows a graph wherein the graphs are obtained from an obstacle detection for an alignment bar acting as moving element 2 as described in FIG. 1.

FIG. 2 shows, an actual torque value 21 wherein such torque value is a value obtained based on the energy applied on the motor to maintain a constant speed. In the example of FIG. 2, the motor is a servomotor fed by a PWM (pulse-width modulation) signal. Each actual torque value 21 may be calculated as:

$$Tv_i = -K_f + K_M * I_{ef};$$

wherein $Tv_i$ is the actual torque value, $I_{ef}$ is the effective energy applied on the motor, $K_f$ is a parameter associated to the friction and $K_M$ is a parameter associated to other variables of the motor, e.g., initial load, motor resistance, etc.

In an example, the obstacle detection may be used in systems wherein the mechanic arrangement is different and/or different sizes and types of motors are used, therefore, an obstacle detection that can accommodate different types of motors and mechanic arrangements may be useful. In such a case, the torque monitorization may be performed for a torque parameter that, in addition to the actual torque value ($Tv_i$), also considers a torque reference value.

One example of torque reference value may be a reference value based on an average torque 22. The average torque 22 may be an accumulated average torque wherein a set of torque values are stored in a memory for a determined period and averaged. Such averaged value may be used as reference value. For example, a memory may store a set of torque values ($T_H$) that may be:

$$T_H = [TV_{i-1}; TV_{i-2}; Tv_{i-3}; \ldots Tv_{i-n}];$$

in this example, $T_H$ corresponds to a set of torque values previously determined by the controller wherein i is the actual determination, and n the number of iterations that are to be stored in the memory, e.g., the number of iterations that correspond to a determined an averaging period. Therefore, the average torque 22 ($T_{AVG}$) may be defined as:

$$T_{AVG} = \frac{\sum_{i-1}^{n} Tv_i}{n-1};$$

In such an example, a torque parameter 23 to be used for the obstacle detection may be the difference between the average torque 22 and the current torque value 21:

$$T_P = |T_V - T_{AVG}|;$$

being, therefore, the torque parameter 23 not dependent, e.g., on wearing of the mechanical elements or changes in the type, or size, of the motors since these effects are eliminated by the operation with the average torque.

The torque parameter 23 may then be compared to a threshold value and, if it exceeds the threshold, e.g., on detection time $T_1$, the controller determines that an obstacle is detected. In an example, the threshold value may be a dynamic value such as a function of the average torque 22, e.g., if the average torque 22 is increased by 100% an obstacle is determined. Also, the threshold value may be a fixed value, e.g., if the torque parameters exceeds 0.01 an obstacle is determined.

In the example of FIG. 2, the torque readings are performed during a detection period ($T_D$) that corresponds to the period wherein the element moves at a substantially constant speed. The torque readings of an acceleration period ($\Delta_T$) are not considered for the analysis as it may increase the computational complexity of the solution.

Figure 3:
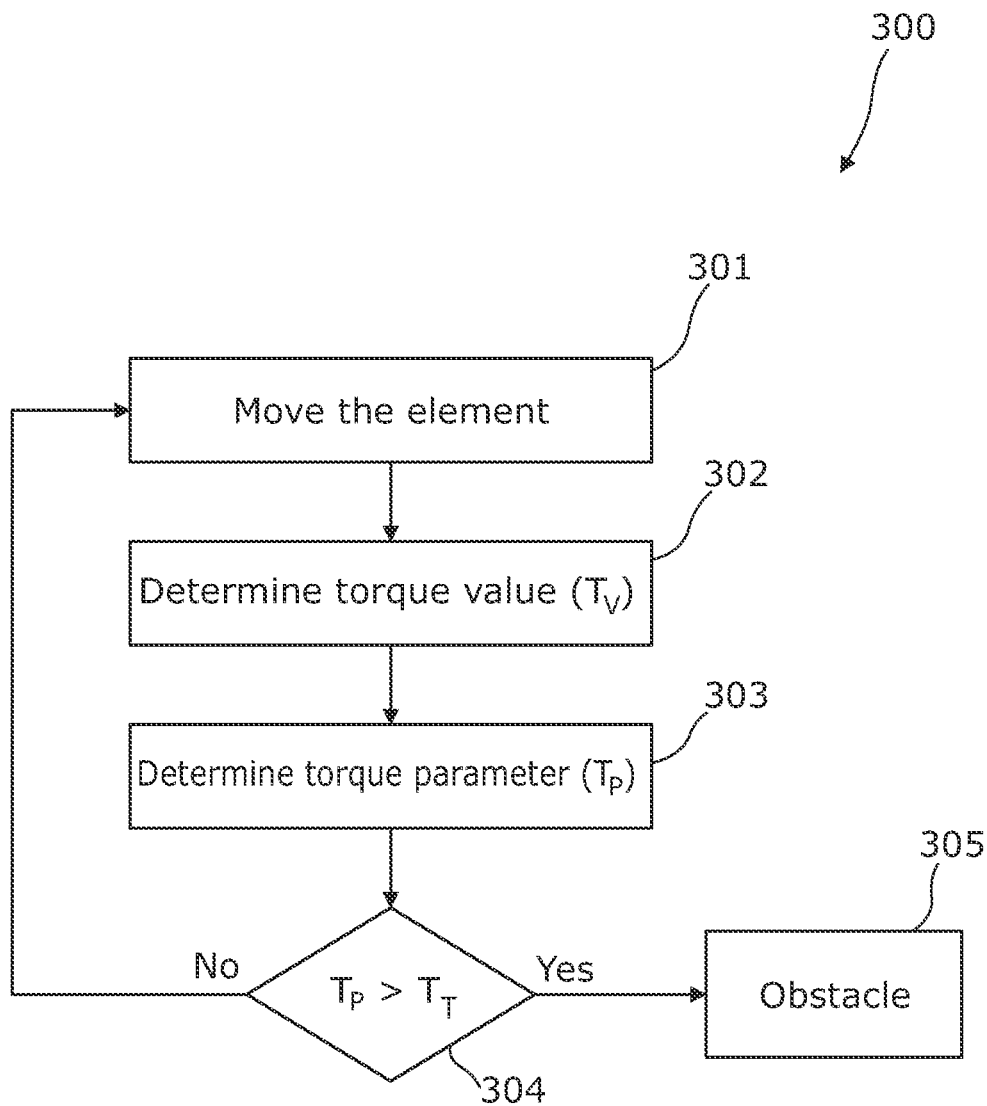
FIG. 3 shows an example of a flowchart of an obstacle detection method.

FIG. 3 shows an example of an obstacle detection method 300 wherein the method comprises moving the element 301 at a substantially constant speed, then, determining a torque value 302 as the element moves at the constant speed. The torque value may be obtained, as explained above, as a function of the effective energy applied on the motor to move the element at the constant speed.

Further, the method comprises determining a torque parameter 303, being the torque parameter based on the torque value determined in block 302 and a reference parameter, e.g., an average of torque values previously determined by the method that may also be considered as historic torque values.

Then, the torque parameter is compared to a threshold value 304. If the torque parameter is above the threshold value an obstacle is detected 305, if the torque parameter is below the threshold, a new iteration starts by moving the element 301.

Figure 4:
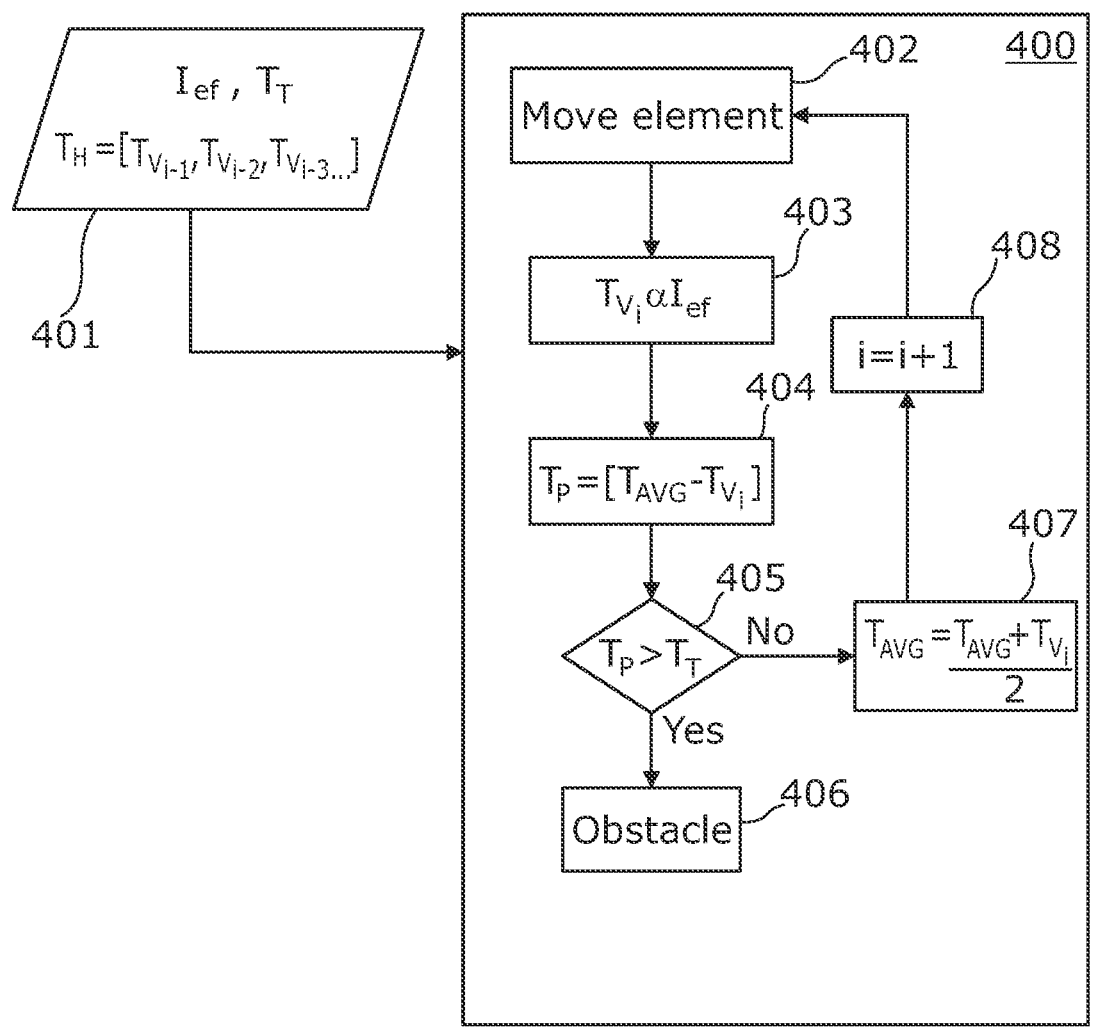
FIG. 4 shows a further example of a flowchart of an obstacle detection method.

FIG. 4 shows a further example with a more detailed explanation of an obstacle detection method 400. The obstacle detection method of FIG. 4 comprises moving an element 402, e.g., at a constant speed. Further, the method includes acquiring data by a controller, in particular, accessing a memory 401 or a further device to obtain a value associated to the energy used by the motor to maintain the constant speed, for example, its effective current $I_{ef}$. Also, the controller may access to memory to obtain a set of historical torque values $T_H$ that, in an example, correspond to actual torque values obtained in previous iterations of the method ($Tv_{i-1}$, $Tv_{i-2}$, $Tv_{i-3}$, ...). Moreover, the controller may acquire a torque threshold value ($T_T$).

Based on the effective current $I_{ef}$, the method includes calculating an actual torque value $Tv_i$ 403 that is proportional to such effective current. Then, a torque parameter is determined 404. In the example of FIG. 4, the torque parameter is a function of the actual torque and the average of the historical torque values $T_H$, in particular, the absolute value of the difference between the torque average and the current torque value.

Then, the controller is to compare the torque parameter to the torque threshold 405. If the torque parameter is above the torque threshold an obstacle is detected 406. If the torque parameter is not above the torque threshold, the torque average is updated 407 by adding the current torque value, the remaining values, such as the iteration number is updated 408 and a new iteration is started by moving the element 402.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. An obstacle detection method for a moving element activated by a motor wherein the obstacle detection method is to:
   move the element at a substantially constant speed;
   determine an actual torque value to move the element at the constant speed;
   determine a torque parameter based on the actual torque value;
   comparing the torque parameter with a threshold value; and determining the presence of an obstacle if the torque parameter is above the torque parameter threshold;

wherein the torque parameter is determined based on a set of historical torque values and the actual torque value, wherein the set of historical torque values comprise torque values determined by the controller on previous movements of the element.

2. The method of claim 1 wherein the determination of the actual torque value comprises a calculation based on an energy applied to the motor to maintain the constant speed.

3. The method of claim 2 wherein the motor is energized using a PWM signal and the energy applied to the motor is an effective energy in the PWM signal.

4. The method of claim 1 wherein the torque parameter is a differential torque calculation between the actual torque value and a previous torque value.

5. The method of claim 1 wherein the threshold value is a function of the set of historical torque values being the set of historical values selected for a threshold period.

6. The method of claim 1 further comprising updating the set of historical torque values with the actual torque value.

7. The method of claim 1 wherein the moving element is an alignment bar.

8. The method of claim 1 wherein the position of the moving element is monitored and wherein, upon the determination of the presence of an obstacle, the position of the moving element corresponding to the obstacle is stored.

9. A printing system comprising a moving element, a motor to move the element and a controller associated to the motor and comprising a memory, the controller being to:
feed energy to the motor as to move the element at a constant speed;
determining an actual torque value based on the fed energy;
determine a torque parameter based on the actual torque value;
compare the torque parameter with a threshold value stored in the memory; and
determine the presence of an obstacle based on the comparison between the torque parameter and the threshold value;

wherein the torque parameter is determined by operating the actual torque value with a reference torque value stored in the memory, wherein the reference torque value comprises a dynamic value.

10. The system of claim 9, wherein the energy is fed to the motor as a PWM signal and the determination of the actual torque value includes calculating the effective energy of the PWM signal.

11. The system of claim 9, wherein the torque parameter is a gradient torque parameter between the actual torque value and the reference torque value.

12. The system of claim 9 wherein the reference torque value is an average of a plurality of previous determinations of the actual torque value.

13. The system of claim 9 wherein the controller is further to update the reference torque value based on the actual torque value.

14. A non-transitory machine-readable medium storing instructions executable by a controller, the non-transitory machine-readable medium comprising instructions to:
move an element at a substantially constant speed;
determine an actual torque value to move the element;
determine a torque parameter to move the element at the constant speed;
compare the torque parameter with a threshold value; and
determine the presence of an obstacle if the torque parameter is above the torque parameter threshold;

wherein the torque parameter is determined by averaging a set of torque values, the set of torque values including the actual torque value.

* * * * *